United States Patent
Kristiansen et al.

(10) Patent No.: US 8,619,112 B2
(45) Date of Patent: Dec. 31, 2013

(54) DEVICE, COMPUTER PROGRAM PRODUCT AND METHOD FOR PROVIDING TOUCH CONTROL OF A VIDEO CONFERENCE

(75) Inventors: Ivan Marius Kristiansen, Oslo (NO); Vegard Hammer, Oslo (NO); Geir Bjune, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 201 days.

(21) Appl. No.: 12/894,751

(22) Filed: Sep. 30, 2010

(65) Prior Publication Data

US 2011/0085016 A1    Apr. 14, 2011

Related U.S. Application Data

(60) Provisional application No. 61/251,509, filed on Oct. 14, 2009.

(30) Foreign Application Priority Data

Oct. 14, 2009  (NO) .................................... 20093142

(51) Int. Cl.
*H04N 7/14* (2006.01)

(52) U.S. Cl.
USPC ........................................ 348/14.01; 382/236

(58) Field of Classification Search
USPC ......... 348/14.01–14.09, 14.9–14.11; 382/236
See application file for complete search history.

(56) References Cited

U.S. PATENT DOCUMENTS

| | | | |
|---|---|---|---|
| 5,568,183 A | 10/1996 | Cortjens et al. | |
| 6,515,687 B1* | 2/2003 | Wynn et al. | 715/840 |
| 6,992,702 B1 | 1/2006 | Foote et al. | |
| 7,760,952 B2* | 7/2010 | Seo | 382/236 |
| 2002/0054216 A1 | 5/2002 | Kawashima | |
| 2006/0026536 A1* | 2/2006 | Hotelling et al. | 715/863 |
| 2007/0040900 A1* | 2/2007 | Castles | 348/14.08 |
| 2007/0171273 A1* | 7/2007 | Saleh et al. | 348/14.08 |
| 2008/0165255 A1 | 7/2008 | Christie et al. | |
| 2008/0246834 A1* | 10/2008 | Lunde et al. | 348/14.09 |
| 2008/0246852 A1 | 10/2008 | Mori | |
| 2009/0015658 A1* | 1/2009 | Enstad et al. | 348/14.08 |
| 2009/0021575 A1* | 1/2009 | Duddy et al. | 348/14.08 |

FOREIGN PATENT DOCUMENTS

| | | |
|---|---|---|
| DE | 10 2004 040 023 A1 | 3/2006 |
| EP | 0 565 830 A2 | 10/1993 |
| EP | 1 814 330 A2 | 8/2007 |
| WO | WO 2006/020305 A3 | 2/2006 |
| WO | WO 2008/150351 A1 | 12/2008 |

OTHER PUBLICATIONS

Patent Cooperation Treaty International-Type Search Report—Completion date of search May 27, 2010.

(Continued)

*Primary Examiner* — Maria El-Zoobi
(74) *Attorney, Agent, or Firm* — Oblon, Spivak, McClelland, Maier & Neustadt, L.L.P.

(57) ABSTRACT

A device, computer program product, and method control the operation of one or more cameras associated with a video conference endpoint in a video conference call. A camera control unit (remote control) includes a touch enabled end user component that presents to the user graphical objects representing video conference endpoints currently connected in a conference call, and/or one or more live video feeds currently captured by the video conference endpoint's cameras, and allows the user to manipulate a camera's pan, tilt and zoom using a touch screen display embedded in said camera control unit.

24 Claims, 10 Drawing Sheets

(56) References Cited

OTHER PUBLICATIONS

Extended European Search Report mailed Sep. 10, 2013, in European Application No. 10823662.1.
Liu et al., "Managing a Camera System to Serve Different Video Requests," Multimedia and Expo, 2002, ICME Proceedings '02, IEEE International Conference on Lausanne, Switzerland, Aug. 2002, vol. 2, pp. 13-16, XP010604686.
Malik et al., "Interacting with Large Displays from a Distance with Vision-Tracked Multi-Finger Gestural Input," Proceedings of the 18th Annual ACM Symposium on User Interface Software and Technology, Oct. 2005, pp. 43-52, XP-002601890.

* cited by examiner

DEVICE, COMPUTER PROGRAM PRODUCT AND METHOD FOR PROVIDING TOUCH CONTROL OF A VIDEO CONFERENCE

CROSS-REFERENCE TO RELATED APPLICATION

The present application claims the benefit of the earlier filing date of U.S. Provisional Patent application Ser. No. 61/251,509, filed in the USPTO on Oct. 14, 2009, the entire contents of which being incorporated herein by reference.

FIELD OF THE INVENTION

The present invention relates to a touch screen control device for a video conferencing system, and more specifically a method, computer program product, and device for controlling a camera of a video conferencing system.

BACKGROUND

Conventional video conferencing systems include a number of end-points communicating real-time video, audio and/or data (often referred to as duo video) streams over and between various networks such as WAN, LAN and circuit switched networks.

In most high-end video conferencing systems, high quality cameras with pan-, tilt, and zoom capabilities are used to capture a view of the meeting room and the participants in the conference. The cameras typically have a wide field-of-view (FOV), and high mechanical zooming capability. This allows for both good overview of a meeting room, and the possibility of capturing close-up images of participants. The video stream from the camera is compressed and sent to one or more receiving sites in the video conference. All sites in the conference receive live video and audio from the other sites in the conference, thus enabling real time communication with both visual and acoustic information.

Video conferences vary a great deal when it comes to purpose, the number of participants, layout of conference rooms, etc. Each meeting configuration typically requires an individual adjustment of the camera in order to present an optimal view. Adjustments to the camera may be required both before and during the video conference. For example in a video conference room seating up to 16 persons, it is natural that the video camera is preset to capture all of the 16 available seat locations. However, if only 2 or 3 participants are present, the wide field of view camera preset will give the receiving end a very poor visual representation, since most of the screen will display unoccupied seating areas.

Adjustments to the camera are typically done using a standard input device, such as a keypad on a remote control or a mouse, either by manually controlling the camera's pan, tilt and zoom, or by choosing between a set of pre-defined camera positions. Typically a traditional IR remote control, like that shown in FIG. 2, with standard push-buttons is used to adjust the camera. A standard setup is a set of four arrow keys to control the pan and tilt, and a zoom-in and zoom-out button to control the zoom.

Finding the optimal camera adjustment on known systems often requires several iterations of pushing buttons on a remote control or an on-screen menu system, which makes it cumbersome, distractive and not very intuitive.

Even though the camera's pan-tilt mechanism include small step motors (allowing "high resolution" movement), the video conferencing system is often programmed to move the camera in steps to spare the user from excessive key pushing. This works as intended when the camera is in a wide FOV, however it may cause trouble when the camera is zoomed-in since the steps then become quite large.

In addition, if a user wants to control the camera of a remote endpoint, the user needs to navigate through a number of on-screen menus to access far end camera control settings, and then if more than one remote endpoint is connected in the conference, choose the correct remote endpoint from a list of connected endpoints. This process is cumbersome, and for inexperienced user it may be difficult to do successfully.

Hence, as recognized by the present inventors, the presently known methods for controlling the camera in a video conference are cumbersome and confusing, therefore the camera is often left in a sub-optimal setting in a video conference, resulting in a degraded video experience.

Today, users of technical installations are accustomed to and demand systems which are easy to use and provide flexibility in ways of customization of graphical environments and collaboration between devices. Traditional video conferencing systems are not very flexible. Further, traditional video conferencing systems are operated using on-screen menu systems controlled by a keypad on an IR remote control device, allowing for limited flexibility and cumbersome user experience.

SUMMARY

It is an object of the present invention to provide a system, computer program product, and method that addresses the above-identified and other drawbacks of conventional approaches.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In the following, the present invention will be discussed by describing various embodiments, and by referring to the accompanying drawings. However, people skilled in the art will realize other applications and modifications within the scope of the invention in light of the present teachings.

The presented invention relates to a system and method for controlling the operation of one or more cameras associated with a video conference endpoint in a video conference call. A camera control unit (remote control) according to the present invention is a touch enabled end user component that presents to the user graphical objects representing video conference endpoints currently connected in a conference call, and/or one or more live video feeds currently captured by the video conference endpoint's cameras, and allows the user to manipulate a camera's pan, tilt and zoom using a touch screen display embedded in the camera control unit.

Network Overview

Figure 1:
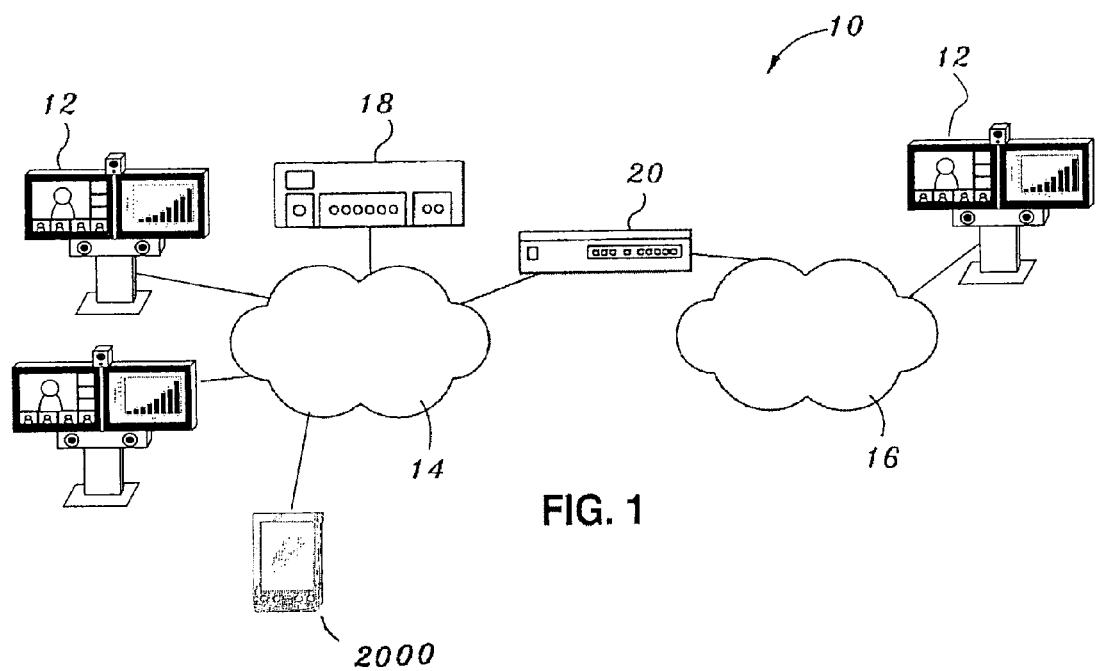
FIG. 1 is a schematic overview of an exemplary communications network in which the present invention may be applied.

Illustrated in FIG. 1 is an example of a communications network 10 in which the present embodiment may be applied. Each user is connected to the communications network through an endpoint apparatus 12. The endpoint apparatus is described in more detail below. The communications network is an internet protocol (IP) network 14. However, users may also be connected to a different communications network such as the Integrated Digital Services Network (ISDN) 16 or other digital communications network, including a packet switched network or a circuit switched network. An MCU (Multipoint Control Unit) 18 may also be connected to a communications network 14, 16 over which the video conference call can be provided. Alternatively one of the endpoint apparatuses 12 includes an embedded MCU for providing multipoint services. A number of endpoint apparatuses 12 residing at different sites may participate in the same conference through one or more MCU's, performing e.g. switching and mixing functions to allow the audiovisual terminals to intercommunicate properly. Each endpoint and hence each audiovisual stream is provided with its own unique endpoint identifier (ID).

If users from more than one type of communications network wish to participate in a video conference call, the two communications networks may be linked using a gateway 20. The gateway allows translation of data transmitted using different protocols into the protocols appropriate for transmission of data across each type of network. A wireless touch panel controller 2000 (e.g., IPAD or IPHONE) for example may also connect to the network 14 via BLUETOOTH or WIFI, for example. The wireless touch panel controller 2000 is used to control the camera settings, or used as the video conference endpoint. Touch panel and touch screen display are used interchangeably herein.

The Endpoint Apparatus

The endpoint apparatus 12 is a device connectable to a communications network for video and/or audio conferencing which enables a user to send information across and receive information from the communications network. For a video conference the endpoint apparatus may be a traditional telephone handset if the user is only connecting to receive audio data. However, more commonly the endpoint apparatus will enable video data to be received from and transmitted across the communications network and also be displayed to the user, and is hereafter referred to as a video conference endpoint. Examples are traditional endpoints 12, or portable wireless endpoints 2000.

Figure 3:
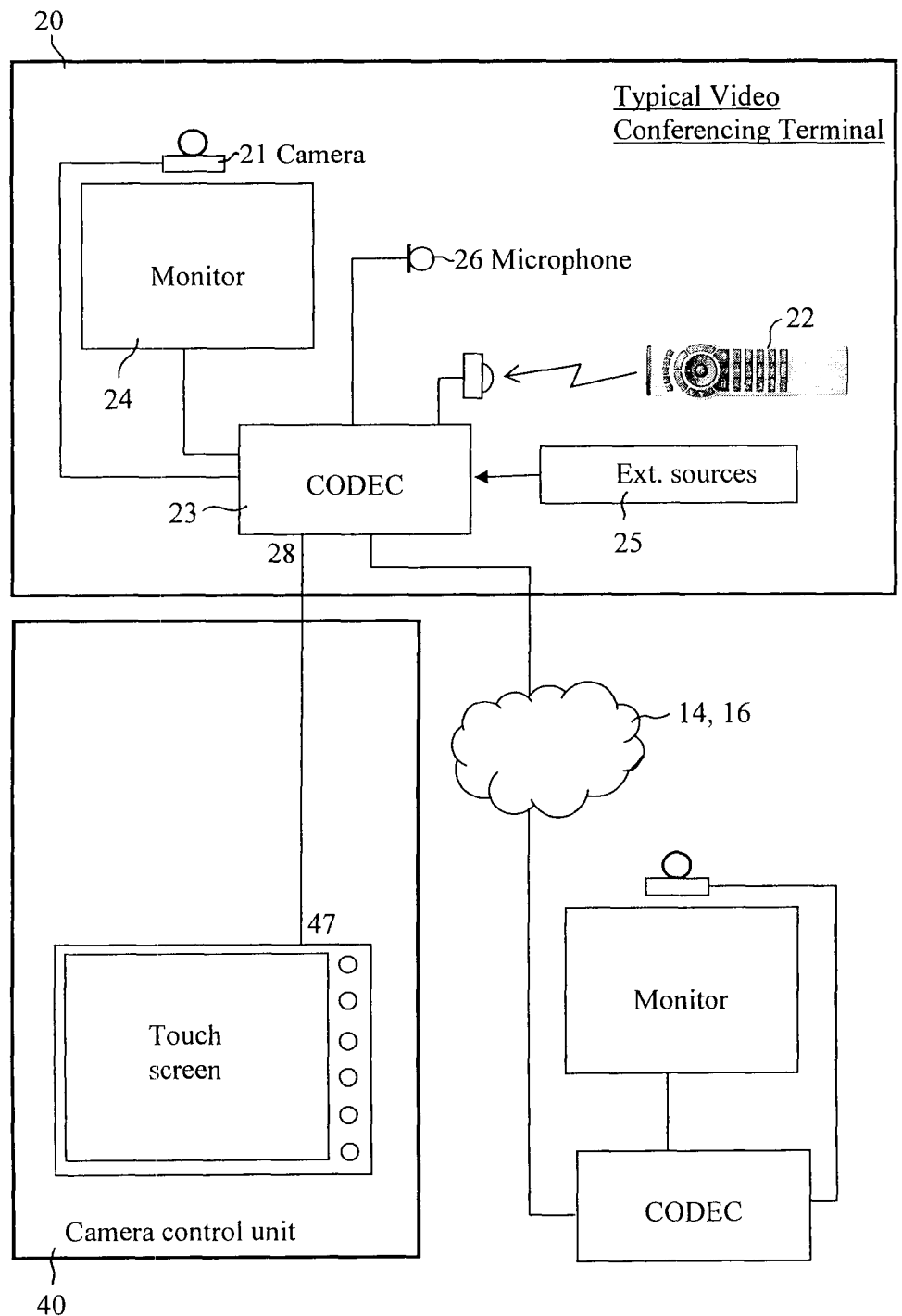
FIG. 3 is a schematic overview of the touch screen control system of the present invention.
Figure 4:
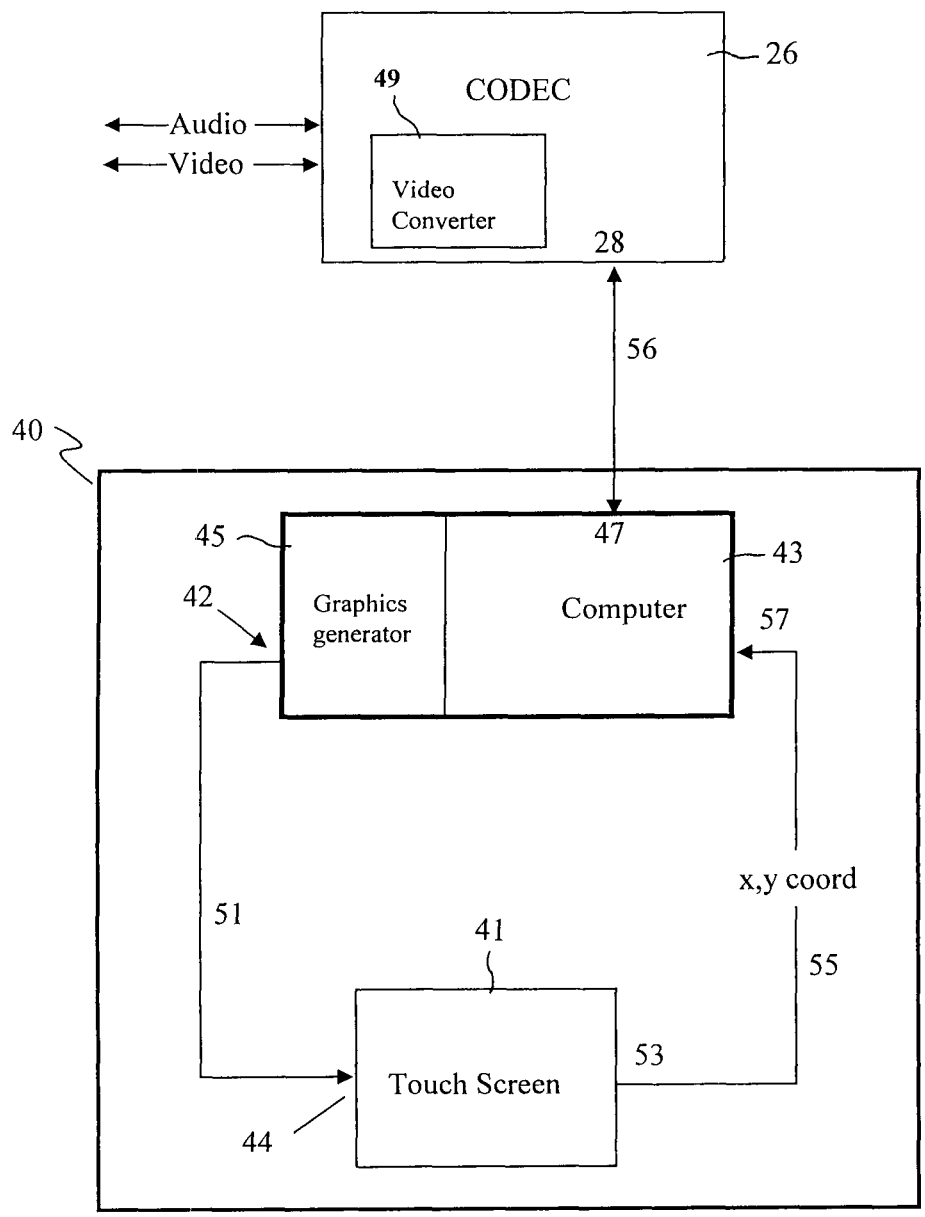
FIG. 4 is a block diagram of the present invention.

Reference is now made to FIGS. 3 and 4. With particular reference to FIG. 3, the typical video conference endpoint is designated by the reference numeral 20. The endpoint 20 includes a camera 21 and a microphone 26 supplying video and audio signals to a CODEC 23 which supplies audio-video signals to one or more monitor(s) 24. The CODEC 23 may also be supplied with signals from external multimedia sources 25, e.g. VCR's, DVD players, document cameras, personal computers, etc. As understood by the double-headed arrow between the CODEC 23 and the external source(s) 25, the CODEC 23 may receive data signals (e.g. video, audio, still images, etc) from the external sources to be displayed on the monitor(s) 24, and/or the signals from the external sources may be sent to other video endpoints connected to the video endpoint 20 via a network 14,16.

The video conference endpoint may be an H.323 or SIP endpoint if it is connected to an IP network or an H.320 endpoint if it is connected to an ISDN network. Incidentally, H.323 and H.320 are standards defined by the International Telecommunications Union.

The video endpoint may also be provided with a far-end camera control (FECC) facility. The FECC facility is traditionally accessed by selecting buttons 24, 26, 28, 30, 32, 34, and 36 on a user input device 22 such as the IR remote control illustrated in FIG. 2 and shown in FIG. 3. The FECC commands travel down the same communications link as the audio and video data and act to control another video endpoint. For example, they allow a user to cause another camera, other than their own, to pan, zoom, tilt or focus. The commands may be sent from the controlling video conference endpoint to the other video conference endpoint using a signaling protocol message such as ITU-T H.281 or H.323 Annex Q, the entire contents of each of which being incorporated herein by reference.

The CODEC 23 (or computer 43 on behalf o the CODEC 23) has an API that allows users to programmatically change the pan, tilt and/or zoom of an endpoint camera using a camera control unit 40. "API" is an abbreviation for "Application Programming Interface". With further reference to FIG. 3, API communications between the camera control unit 40 (or remote control) and the CODEC 23 are exchanged via a port 28 in the CODEC 23 and a port 47 in the camera control unit 40. This part may optionally be configured as a wireless link, such as BLUETOOTH or WIFI, and the control unit may be a mobile device 2000 (see FIG. 1). This interface accessed via the port 28 permits the presently described system to communicate with the CODEC 23, so that the camera control unit 40 according to the present embodiment can provide the CODEC 23 with a desired series of commands and receive responses from the CODEC 23.

With reference to FIG. 4, the components of a system according to the present embodiment are generally designated by the reference numeral 40 and are seen to include a touch screen display unit 41, a personal computer 43 and a graphics generator 45. As seen, the personal computer 43 (or processor of mobile device 2000) has a port 47 to which is coupled a communication link 56 coupled (wired or wirelessly) to the API communications port 28 of the CODEC 23.

The touch screen display 41 includes an LCD screen or other video display technology (CRT, OLED, Plasma, etc.) that can be of varying size. In addition to the display screen, the touch screen 41 contains hardware that overlays the display/screen with a matrix of x' and y' coordinate detectors. When an object (finger, stylus, etc) applies pressure (touch) to the touch screen display, it transmits a command to the computer 43. The command at least includes the x' and y' coordinates of the point where the pressure was applied. The graphical interface may be implemented with a downloadable "app"

that is executed on the mobile device 2000. The downloadable app is a software program that is executable on the mobile device 2000.

The camera control unit 40 communicates with the CODEC 23 using the previously mentioned API. The communication between the CODEC 23 and the camera control unit 40 include information from the CODEC 23 and commands to the Codec 23. When a video conference call is started, the CODEC 23 sends information to the camera control unit at least identifying the number of participants, and endpoint identifier for each participant.

According to one exemplary embodiment of the present invention, the CODEC 26 includes a video converter 49. The video converter 49 receives video streams/video conference streams from the near end camera/endpoint and/or one or more video conference streams from a far end video conference endpoint, processes the video streams/video conference streams, and outputs a corresponding set of video streams with reduced resolution and/or bit rate. According to one exemplary embodiment of the invention, the video converter 49 generates one or more video streams by coding the received video streams according to one of a number of standards for coding video for real time applications, such as ITU-I H.261, H.262, H.263, H.264 or similar video coding standards. According to another exemplary embodiment of the present invention, the video converter takes snapshots of the received video streams at predefined intervals, and then resizes the snapshots before it outputs the series of snapshots as a video stream. The video streams are resized because the touch screen display is normally of a much smaller size than the size of a video conference endpoint monitor 24 for which the received video streams are intended for. Typical intervals of such an embodiment can be in the range of 30 snapshots per second to 1 snapshot every 5 seconds.

In response to receiving the information from the CODEC 26, the computer generates a graphical user interfaces (GUI) to be displayed on the touch screen display 41. The GUI is used for controlling operation of one or more cameras, such as a near end camera or a far end camera. The graphical user interface can also include a number of touch controls, menus, and dialogs that can be displayed on the touch screen display 41 for a user to operate and control the endpoint X. For example, the GUI can allow the user to place or answer a video conference call; disconnect one or more video conference calls; control a near end camera; control a far end camera; and other typical video conference actions. Once again the GUI and control functions may be implemented by way of an app on the mobile device 2000.

According to one embodiment, when a video conference call is started, the CODEC 26 sends a signal to the camera control unit indicating that a conference is started and identifying at least the unique conference ID of the video conference endpoint participating in the conference call. In response to receiving the signal from the CODEC 26, a graphics generator 45 under control of the personal computer 43 generates and provides to the touch screen 41 via a port 42 a graphical user interface for allowing operation of one or more cameras associated with one or more of the video conference endpoints connected in the video conference call. Alternatively, the graphical user interface for allowing operation of one or more cameras are only generated and provided to the touch screen 41 upon a request from the user.

Figure 5:
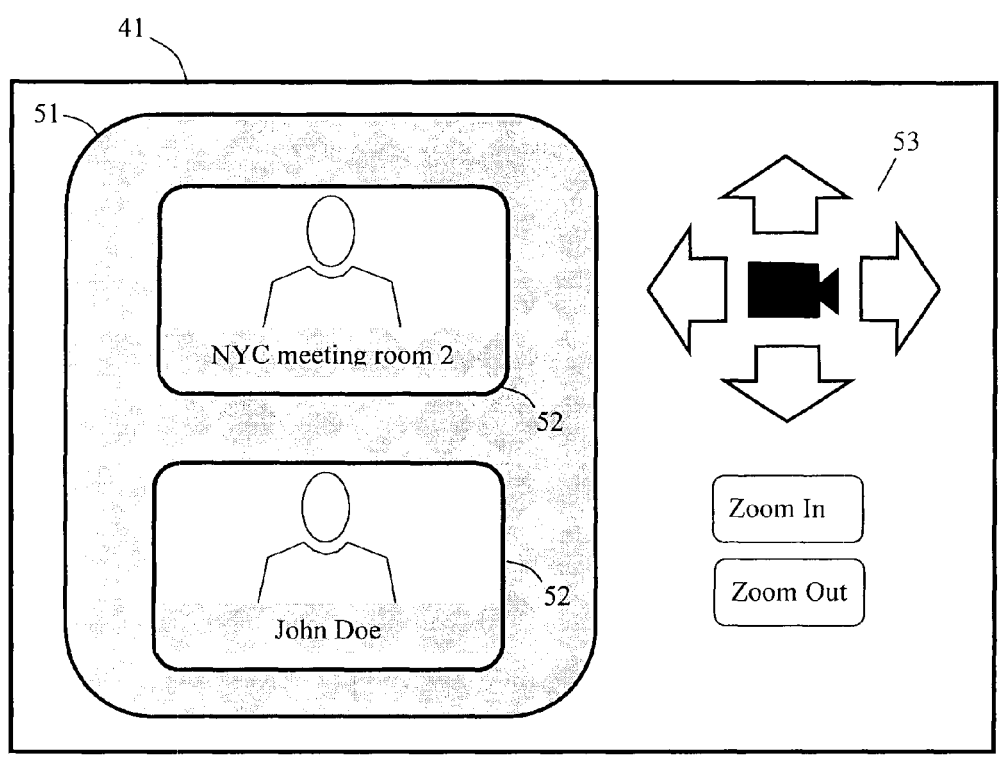
FIG. 5 is a schematic overview of one exemplary embodiment of the present invention.

As illustrated in FIG. 5, the graphical user interface is composed of a scene 51, where the scene 51 is a defined area including graphical objects 52. The scene 51 may or may not be outlined with a distinct border, and if the scene is not outlined the scene will appear to be part of the background. Each graphical object 52 represents one of the video conference endpoints connected in the ongoing conference call. According to another exemplary embodiment the graphical user interface also include a menu area 53 in addition to the scene.

The scene 51 is a graphical representation of the conference call, and visualizes to the user the different participants in the call. The scene 51 may or may not include a graphical object 52 representing the local video conference endpoint to which the camera control unit 40 is connected.

According to one embodiment of the present invention the graphical objects 52 are images identifying the video conference endpoints that the graphical objects represent respectively. The image may be an outline of one or more persons (avatars), a computer generated image, a photograph, text describing the video conference endpoint (e.g. name of participant, name of video conferencing system (e.g. endpoint ID), the name of the location where the video conference system is located, etc.), or a combination of two or more of the above.

According to another embodiment the graphical objects are live video feeds from the connected video conferencing endpoints. The live video feeds are provided by the video converter described above.

Figure 6:
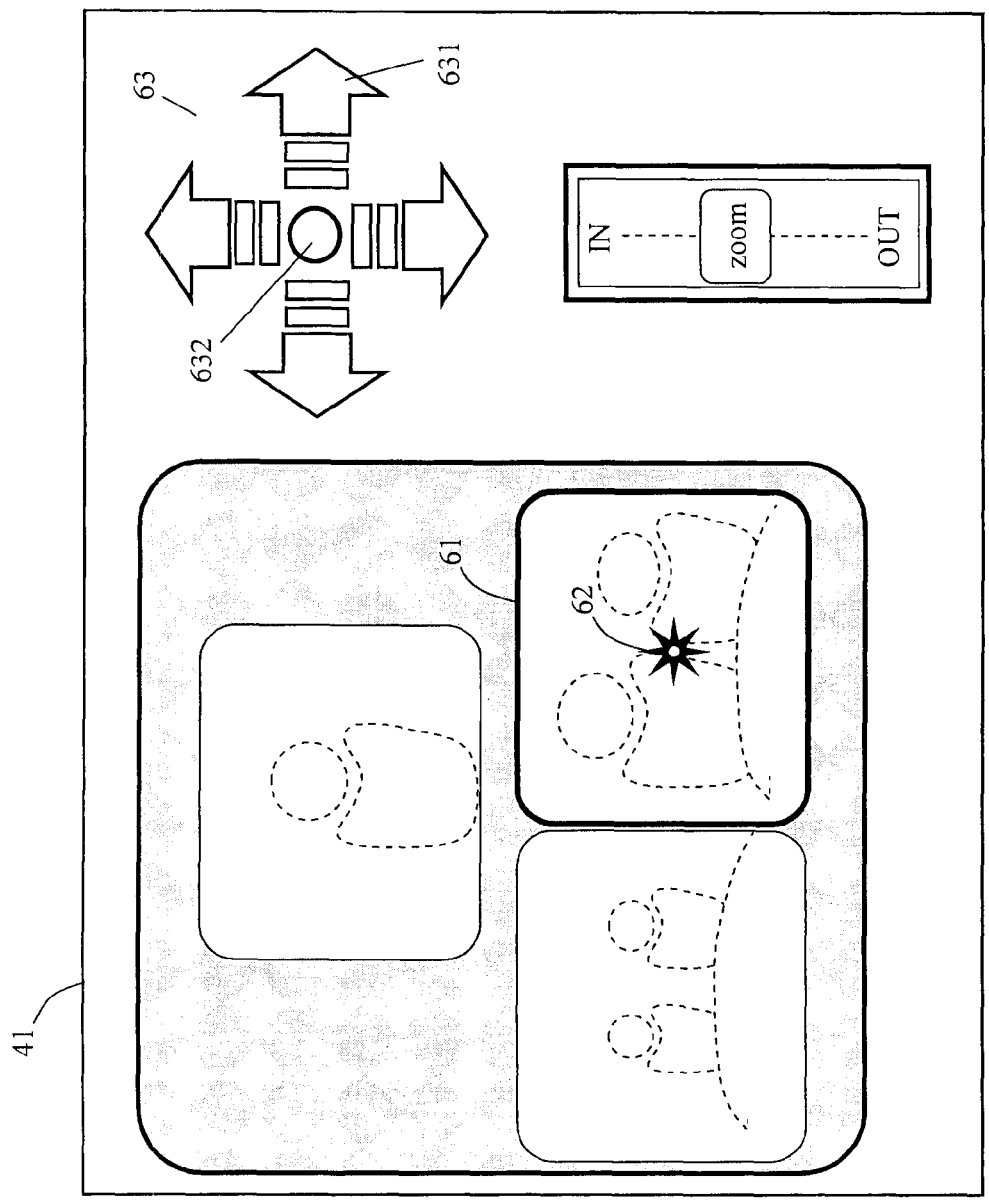
FIG. 6 is a schematic overview of another exemplary embodiment of the present invention.

As illustrated in FIG. 6, when a user touches (the symbol 62 represents a touch registered by the touch screen system 41) the screen of the touch screen system 41 with an object (e.g. finger or stylus), the x and y coordinates corresponding to the location of the touched point 62 are transmitted to the computer 43 via the port 53, the conductor 55 and a port 57 on the computer 43. If a user touches a coordinate within an area of the screen displaying one of the graphical objects 52 (as in FIG. 6), the computer compares the touched x and y coordinate with the content of the GUI, and interprets the user's action as a selection of the touched graphical object 61, and hence a selection of the video conference system associated with that graphical object. The user may then operate the camera associated with the video conferencing endpoint represented by the selected graphical object. The selected graphical object 61 may be highlighted to illustrate to the user that the camera control unit (remote control) has registered the user's selection. Alternatively, the selected graphical object is enlarged. According to one embodiment the selected graphical object is enlarged while the other graphical objects are reduced in size. According to another embodiment the selected graphical object are enlarged so as to cover the entire scene.

The various graphical camera view options shown in FIG. 6 are associated with corresponding fixed camera settings that correspond with camera pan, tilt, and zoom setting that correspond with the GUI option. The fixed camera settings can be used for an initial rough adjustment, that can be further refined through user interaction with the touch screen. For example, the top "single person" option displayed in the touch screen system 41 has a pre-set pan, tilt, zoom setting for that particular far-end endpoint, which would reflect the physical layout at that particular location. Moreover, the physical layout would reflect a distance to the camera for that particular seat, height of the seat, and angle of the seat relative to the camera. The camera or the endpoint may save these settings in computer readable memory. The bottom left display, showing two avatars at a distance would reflect a different camera setting. Likewise the object 61 reflects yet another pan, tilt, zoom camera setting for that physical location.

The operation of the camera(s) is performed using the touch screen. The camera control unit will provide the user with visual, audible and/or tactile feedback when the user operates the camera control. The feedback ensures the user that the camera control unit has registered the users command. Examples of visual feedback are that the arrow keys change form, size or color when pressed. One example of tactile feedback is that the camera control unit 40 include a vibrating device and that the vibrating device is activated when a camera control (e.g. arrows keys) are pressed. An example of audible feedback is that the camera control unit 40 includes a loudspeaker and that the camera control unit emits a sound via the loudspeaker when a camera control is pressed or camera control gesture is performed.

According to one embodiment the operation of the camera involves displaying camera controls on the touch screen display and receiving touch data from a user with respect to those camera controls to control operation of the camera. When generating the GUI, the computer designates at one area of the GUI for each touch control (up, down, left, right, zoom in, zoom out, etc). When the computer receives touch data (coordinates) from the touch screen display 41, the computer compares the coordinates with the designated areas and associates the received touch data with the camera control instruction designated for the touched area.

According to one exemplary embodiment the displayed camera controls includes a set of arrow keys, or similar buttons indicating direction, for controlling up, down, left and right movement of the camera. Camera controls for operating the camera's zoom function include a sliding bar or alternatively two buttons representing zoom-in and zoom-out respectively. The user may operate the camera by pressing the desired arrow key (or zoom key) repeatedly, or by pressing and holding, until the camera has moved to the desired position. One exemplary camera control as described above is illustrated in FIG. 5.

According to one embodiment the operation of the camera involves applying a tactile finger gesture in general or on certain areas of the GUI. The computer receives the finger gestures as a series of consecutive touch coordinates. The computer designates a finger gesture for each touch control (up, down, left, right, zoom in, zoom out, etc), either as a gesture performed anywhere on the screen or as a gesture performed in connection with a certain area. When the computer receives touch data (coordinates) from the touch screen display 41, and if a series of consecutive coordinates imply a gesture, the computer compares the coordinates with the designated gestures and associates the received touch data with the camera control instruction designated for the performed gesture.

Figure 7:
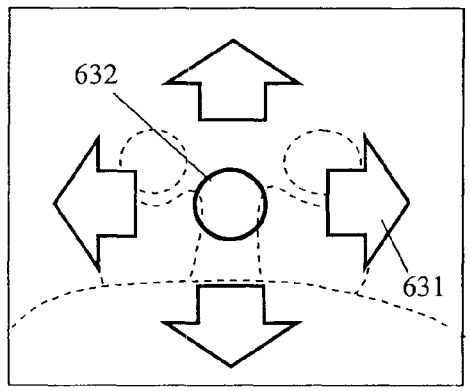
FIG. 7 is a schematic overview of another exemplary embodiment of the present invention.
Figure 7:
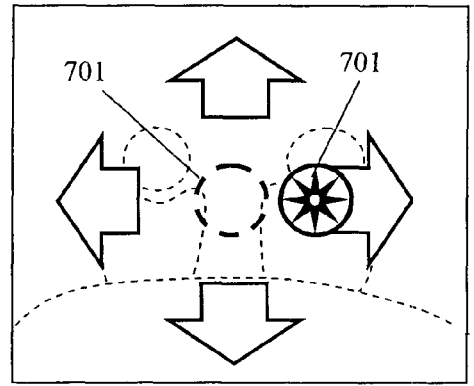
Figure 7:
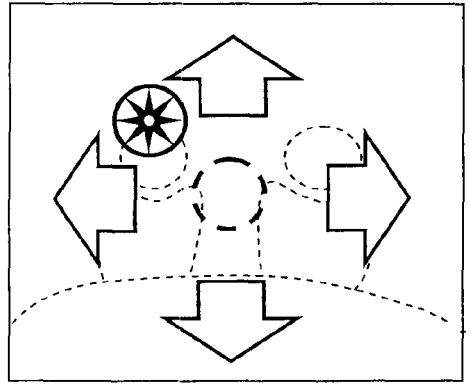

According to one exemplary embodiment the displayed camera controls include a virtual joystick, as illustrated in FIG. 6 and FIG. 7. The virtual joystick 63 can e.g. include a set of arrow keys 631 and a central body 632 (or joystick icon). By dragging the central body 632 in a desired direction, the user is able to control the pan-tilt camera more freely and intuitively, without the restrictions of the stepwise movement of 4 directions. In this embodiment the camera may be moved in any direction with one movement or touch. Additionally, the speed of the camera pan/tilt may be determined by the distance between the current position 702 and the initial position 701 of the body. When the user releases the central body 631, the camera stops moving.

Figure 8:
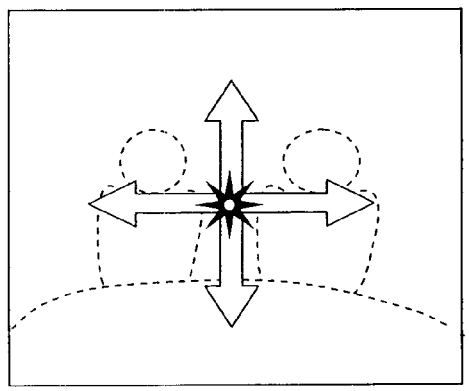
FIG. 8 is a schematic overview of another exemplary embodiment of the present invention.
Figure 8:
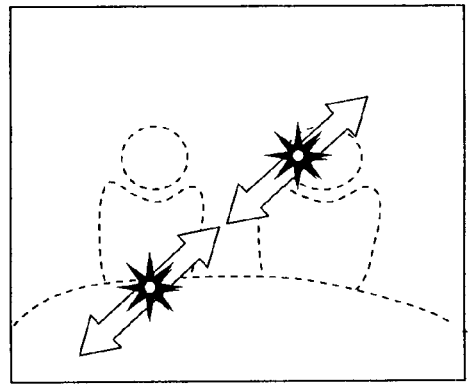
Figure 8:
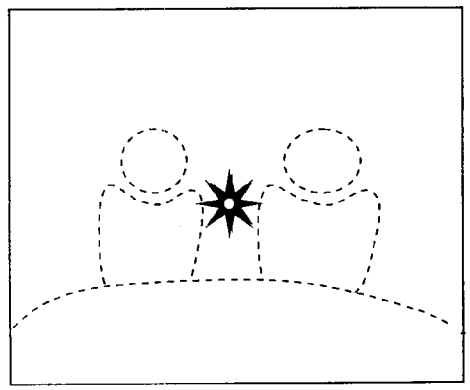
Figure 8:
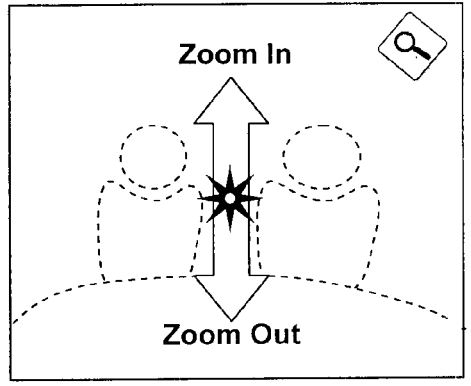

According to yet another embodiment, when the graphical objects are live video feeds, the camera may be operated by interacting with the graphical object directly. Since the user now can see the actual image captured by a camera on the touch screen display (in the GUI), the user can operate the camera's pan, tilt and zoom movements by performing finger gesture on the live video stream in the GUI, as illustrated in FIG. 8. The user may control a cameras pan/tilt by performing a drag and drop finger gesture on the video stream, as shown in FIG. 8*a*. In this embodiment, the video stream from the currently controlled camera is constantly updated during the drag and drop procedure. In this way, the GUI allows the user to drag the image around on the touch screen display until a desired view is found, just as a physical object can be moved on a desk or table surface. Further, the user can zoom by performing certain predefined gestures on the displayed video stream, e.g. by performing pinching movements of two or more fingers while continuously applying pressure to the touch screen for zooming in and zooming out, as illustrated in FIG. 8*b*. Alternatively, the zoom function may be activated by pressing and holding for a predetermined period of time (e.g. 0.5-2 seconds). After the predetermined period of time, a zoom icon and/or a sliding bar may appear to illustrate that zoom-function is activated. Then the zoom may be operated by sliding the finger in a horizontal or vertical direction as shown in FIG. 8*c-d*.

Figure 9:
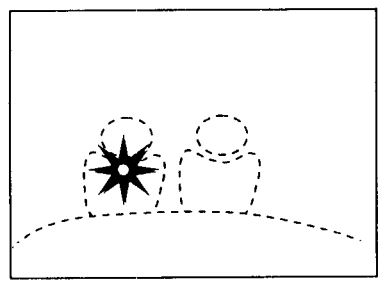
FIG. 9 is a schematic overview of another exemplary embodiment of the present invention.
Figure 9:
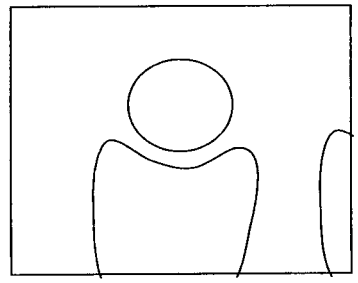
Figure 9:
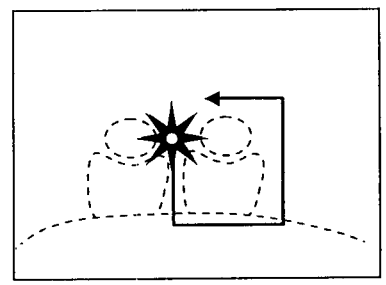
Figure 9:
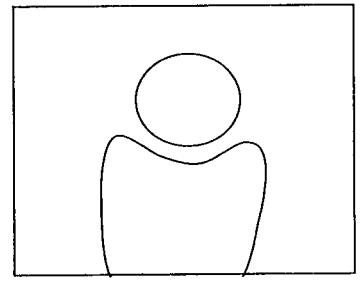
Figure 9:
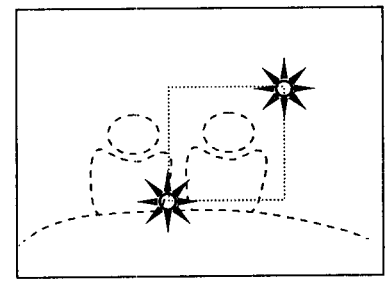
Figure 9:
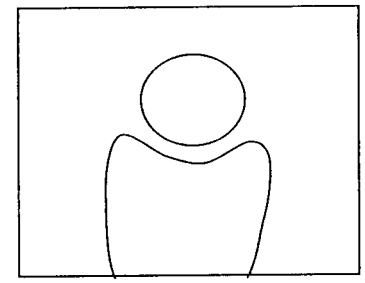

According to yet another embodiment, when the graphical objects are displaying live video streams, the user may zoom in on a participant of choice by tapping on or double tapping (or any other suitable gesture, such as a simultaneous separation of two fingers that are in contact with the touch screen) on a participant in the live video feed, as illustrated in FIG. 9*a*. When double tapping on a participant, the camera control unit will instruct the camera associated with the relevant video stream (via the local CODEC 26) to zoom in on that person. For fixed installations, e.g. conference rooms with fixed seating and constant distances between camera and participants) this can easily be performed by panning, tilting and zooming in to a predefined camera position (preset). If the associated conference room is not a fixed installation, face detection algorithms may be applied to determine the position and size of a face closest to the touched x' and y' coordinate. If a face is detected, and position and size of the face is obtained, the camera control unit calculates an appropriate pan, tilt and zoom position to frame the participant of choice, and sends the camera control instructions to the CODEC, which in tern instructs the relevant video endpoint and camera using the Far End Camera Control (FECC) protocol. Exemplary face detection systems and methods applicable for camera control use herein are found in US Patent Publication 20090015658, the entire contents of which being incorporated herein by reference.

According to yet another embodiment, when the graphical objects are live video feeds, the user can zoom in on one or more participant(s) or any other area of the live video feed by framing the area of interest using gestures recognized by the computer 43. As illustrated in FIG. 9*b*, the area of interest can be defined by navigating a finger or object on the touch screen around the area of interest, or by defining at least two of the corners of the area of interest by tapping or double tapping two or more fingers on the touch screen as shown in FIG. 9*c*.

Next, when the user has touched the desired camera control button in the graphical user interface displayed on the touch screen or applied a finger gesture associated with a camera control, according to one or more of the embodiments above, the computer 43 receives the touch data from the touch screen display and associates them with camera control instructions understood by the CODEC.

The computer then transmits a command (or signal) including the endpoint ID of the selected video conference endpoint and the camera control instructions. The relevant endpoint ID identifies which of the connected video conferencing system the selected video stream originates from, and hence to which video conference system the FECC instructions should be sent to, or if the camera control instructions should be sent to its own camera. The command is sent to the CODEC 26 via the port 47, the communication link 56 and a port 28 on the CODEC 26. If the received endpoint ID is the ID of the receiving CODEC 26, the CODEC sends control instructions to the camera connected to the CODEC 26. If the received endpoint ID is the ID of one of the remote video conference systems connected to the CODEC, the CODEC generates FECC instructions based on the received command and sends to the identified video conference system, which in turn sends a control instruction to its camera.

According to one embodiment, the camera control unit is a dedicated device. The dedicated device may be a default part of the video conferencing system, or be an add-on device acquired separately.

According to another embodiment, a portable computing device, such as a personal digital assistant, mobile phone, laptop computer, tablet computer or similar portable computing device having a touch screen interface and a communication interface supported by the video composing Server 26 (e.g. TCP/IP), may be utilized as the camera control unit. A client software program (e.g., camera control client app) may be downloaded and/or installed on such a portable computing device enabling the portable computing device as a camera control unit.

The computer 43 in the camera control unit 40 may in addition to a processor include a memory medium(s) on which one or more computer programs or software components according to one embodiment of the present invention may be stored. For example, the graphics generator to be deployed may be stored on the memory medium of the computer 43. Also, the memory medium may store a graphical programming development application used to create the graphics generator, as well as software operable to convert and/or deploy the graphics generator on the portable computing device. The memory medium may also store operating system software, as well as other software for operation of the computer system.

FIG. 4 is similar to FIG. 3, but emphasizes particular components of discussed above. Like reference numerals in FIG. 4 refer to like components in FIG. 3. The system 40 permits control of the CODEC 26 through the use of the easy-to-use touch screen 41 which is controlled by the personal computer 43, an intelligent device that ensures logical operation, may give users second chances through display of a request to verify that a correct choice has been made, and guards against erroneous operations.

In more detail, the computer 43 is capable of executing logical instructions written in a computer programming language. The computer 43 controls operation of the CODEC via a PCI or other appropriate bus physically installed in the computer 43; with the CODEC 26 via a communication link 56 schematically represented in FIG. 4. According to one exemplary embodiment the communication between the computer 43 and the CODEC 26 is exchanged using TCP/IP over communication link 56. Communication link 56 may be a wired or wireless link, such as PAN, CAN, MAN, LAN, WLAN, WAN, etc. The communication between the CODEC 26 and the computer are commands that go back and forth between the port 47 of the computer 43 and the port 28 of the CODEC 26. As should be understood, these communications conform to the manufacturer's Application Programming Interface (API) of the video composing Server 26.

Communications also occur using the touch screen 41 via a communications link shown in FIG. 4 and designated by the reference numeral 55 for the conductor and 53 and 57 for the ports. Images from the computer/graphics generator is transferred to and displayed on the touch screens display via port 42, conductor 51 and port 44.

Figure 2:
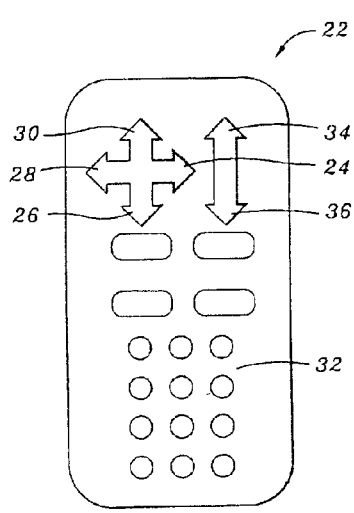
FIG. 2 is a schematic overview of a prior art remote control.
Figure 10:
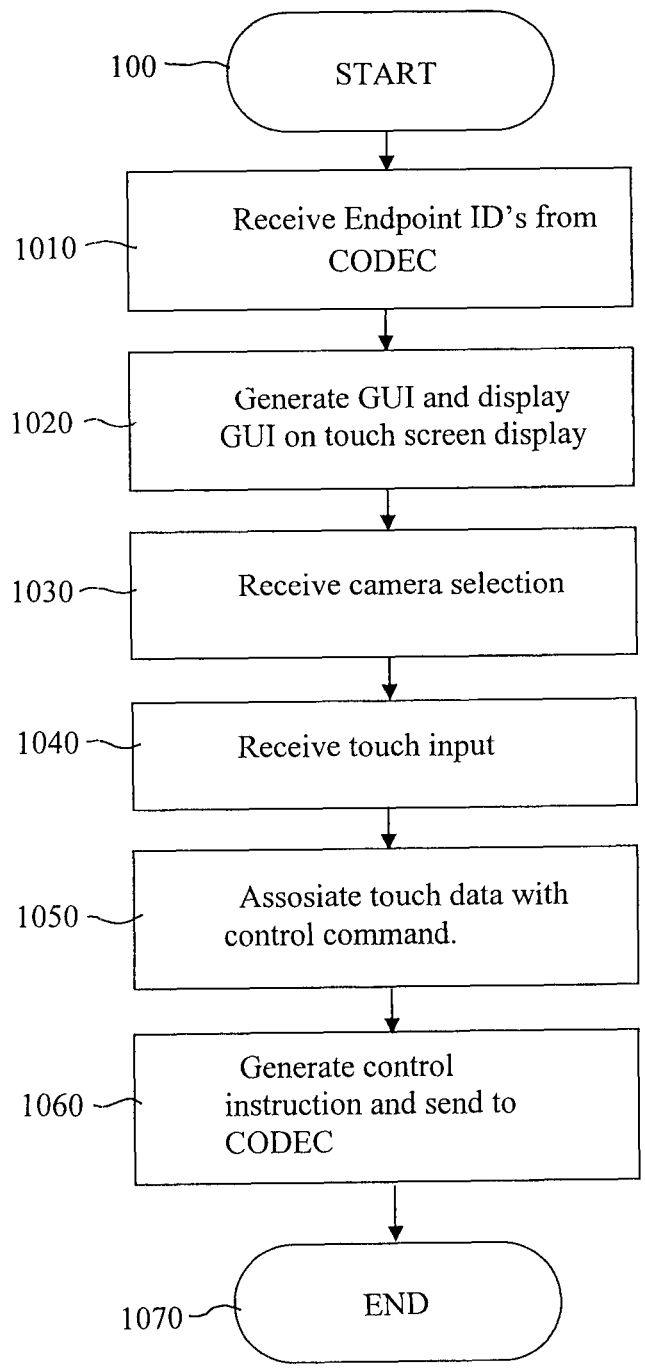
FIG. 10 is a flow diagram illustrating the method according to the present invention.

With reference to FIG. 10, communication between the CODEC 26 and the computer 43 follows a similar procedure. When predefined events occur in step 1000, the CODEC 26 sends in step 1010 a command/signal to the computer 43, at least including a set of Endpoint ID's identifying the video conference endpoints currently connected to the CODEC 26 (directly or via an MCU) in a conference call. The predefined event may include: when a video conference is started, when a new video conference endpoint joins an ongoing conference, when a camera control unit connects to the CODEC 26 during a conference, on request from the camera control unit, etc. For example, using a video conferencing endpoint C' as illustrated in FIG. 2, a user C calls participant A on a video conferencing endpoint A' and a participant B on a video conferencing endpoint B'. The video conferencing endpoint C' is already connected to a camera control unit according to an embodiment of the present invention, and when the conference starts (all the endpoints are connected) the CODEC 26 of video conference endpoint C' sends a command to the camera control unit's computer 43, indicating that a conference is ongoing and identifying at least the Endpoint ID's of each of the video conference endpoints in the present call (in this case the Endpoint ID of video conference systems A', B' and C').

Next in step 1020, the computer (graphics generator) creates a graphical user interface (GUI) having at least a scene 51. The Scene 51 is a dedicated area of the GUI dedicated for illustrating the currently connected endpoints of the ongoing video conference. Based on the received Endpoint ID's the computer generates a set of graphical objects, one for each received Endpoint ID. The graphical objects occupy parts of, or the entire dedicated area of the scene. Even though one graphical object is generated for each video conference endpoint, the user can control the setup of the scene, e.g. the graphical object representing the local video conference endpoint may be omitted. In its simplest form the graphical objects comprise one or more avatars and a text field containing information associated with the relevant video conference system. The text in the text field may be the Endpoint ID itself, or information associated with the Endpoint ID stored in a memory or network device accessible to the computer, such as the name of the participant, name or address of the video conference system, Endpoint ID, etc. In another exemplary embodiment, the graphical objects comprise live video feed from the respective video conference systems. The computer sends the GUI (image) to the touch screen display 41 via the port 42, communication link 51 and port 44 on the touch screen display 41.

A user now has a very readily understandable graphical representation of all the participants in the video conference call. Next, in step 1030, to control a camera the user selects a camera (or video conference endpoint) to control by touching one of the graphical objects 52 in the Scene 51. In response to the user's selection (touch), the touch screen 41 transmits the x and y coordinates of the touched area or areas to the computer 43 via port 53, communication link 55 and port 57. The computer 43 registers the users selection of camera (video conference endpoint) to control and the computer and graphics generator process the information from the touch screen and update the GUI (Scene) by e.g. outlining or enlarging the selected graphical object, and hence the image displayed on the touch screen, live.

In step 1040, a user controls a selected video conference endpoint's camera by manipulating the GUI (e.g. graphical objects, control menus, buttons, gestures) by touching the touch screen 41 and/or performing finger gestures on the touch screen 41 as described in more detail above. The user's touch data is sent to the computer 43 via link 55 in the form of x and y coordinates.

Next in step 1050, upon receiving the touch coordinates, or set of consecutive touch coordinates (gesture), the computer 43 compares the touch coordinates with a set of areas of the GUI and/or finger gestures designated as camera control instructions. The designation of at least one area of the GUI and/or at least one finger gesture as at least one camera control instruction is performed either as a preconfigured designation stored in a memory accessible to the computer 43 or the designation are made when generating the GUI and temporarily stored in a memory accessible to the computer 43. If a positive match is found the computer associates the received touch coordinates with a camera control command.

Next, in step 1060, if the computer associates the received touch coordinates with a touch command, the computer 43 sends a command to the CODEC 26, at least comprising an Endpoint ID and the associated control command. The CODEC 26 analyses the Endpoint ID and the associated control command, and either generates a FECC command and sends it to the relevant video conference endpoint, or sends the camera control commands to its local camera if the Endpoint ID identifies said local video conference endpoint 20.

In a final step 1070, the CODEC 26 then sends an action completed signal to the computer 43 via the port 28, communication link 56 and port 47. Once the action has been completed in the manner described above, the computer 43 awaits indication of the next touch of the screen 41 by the user, either in the form of a new camera control instruction or a new camera selection or a change in number of connected video conference endpoints in the conference call.

Figure 11:
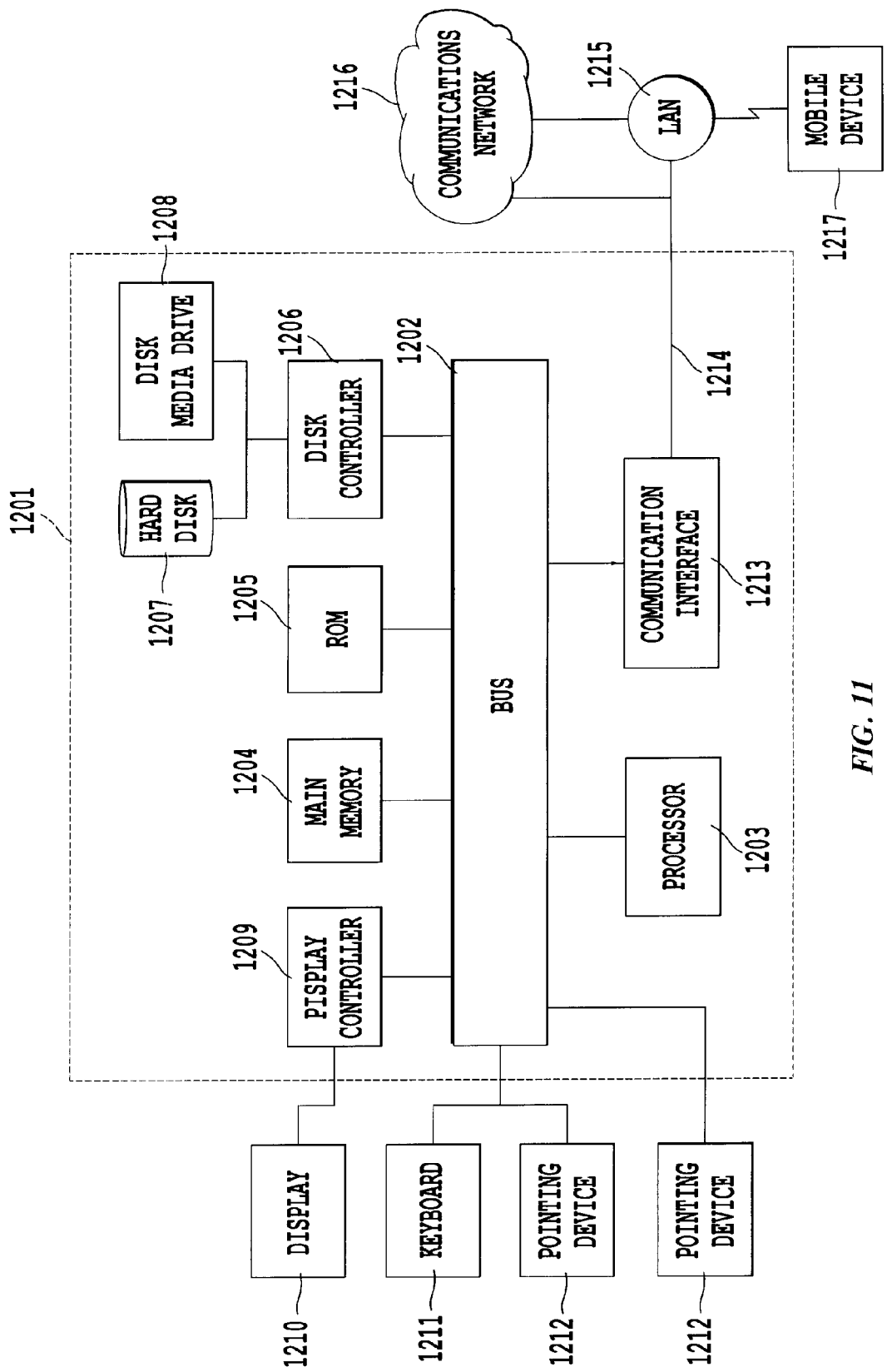
FIG. 11 illustrates a computer system upon which an embodiment of the present invention may be implemented.

FIG. 11 illustrates a computer 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT) or LCD display, for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps in an embodiment of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable storage media, the embodiments of the present invention include software for controlling the computer system 1201, for driving a device or devices for implementing the invention, and for enabling the computer system 1201 to interact with a human user. Such software may include, but is not limited to, device drivers, operating systems, development tools, and applications software.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable storage medium" as used herein refers to any physical medium that participates in providing instructions to the processor 1203 for execution. A computer readable storage medium may take many forms, including but not limited to, non-volatile media and volatile media. Non-volatile media includes, for example, optical, magnetic disks, and magneto-optical disks, such as the hard disk 1207 or the removable media drive 1208. Volatile media includes dynamic memory, such as the main memory 1204.

Various forms of computer readable storage media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Numerous modifications and variations of the present invention are possible in light of the above teachings. It is therefore to be understood that within the scope of the appended claims, the invention may be practiced otherwise than as specifically described herein.

The invention claimed is:

1. A remote control device comprising:
   a touch screen display;
   a processor communicatively connected to the touch screen display; and
   a non-transitory computer readable memory having instructions that when executed by said processor configure the processor to:
   establish a communication link with at least one remote video conferencing endpoint having a camera and receive an endpoint ID from the at least one remote video conferencing endpoint;
   generate at least one graphical object in response to receiving the endpoint ID;
   display on the touch screen display a graphical user interface having the at least one graphical object as part of a videoconference scene used to control at least one setting on the camera;
   receive touch data in response to an external input applied to a portion of the touch screen display on which the at least one graphical object is displayed and associate said touch data with a camera control instruction; and
   send to the remote video conferencing endpoint the camera control instruction to remotely control the camera.

2. The remote control device according to claim 1, wherein said at least one graphical object comprises a video stream image from the camera at the at least one remote video conferencing endpoint.

3. The remote control device according to claim 2, further comprising:
   a CODEC, said CODEC including a video converter that receives streams of conference video from at least two endpoints, processes said streams, and outputs a corresponding set of video streams with reduced resolution and/or frame rate, wherein
   said processor is configured to receive said set of video streams and display said streams of conference video in said graphical user interface.

4. The remote control device according to claim 1, wherein said processor is further configured to:
   generate a separate control area of the graphical user interface that includes a joystick icon; and
   designate the camera control instruction based on a position and distance of the joystick icon relative to an initial default position.

5. The remote control device according to claim 1, wherein said processor is further configured to:
   designate camera control instructions based on finger gestures as said external input applied to said touch screen display over the at least one graphical object.

6. The remote control device according to claim 1, wherein said camera control instruction includes at least one of a zoom-in camera control instruction and a zoom-out camera control instruction generated in response to a pinch-in or pinch-out gesture respectively applied on said touch screen.

7. The remote control device according to claim 1, wherein said camera control instruction includes designating a move up and/or down and/or left and/or right camera control instruction for a touch and drag gesture applied on said touch screen in an up and/or down and/or left and/or right direction.

8. The remote control device according to claim 7, wherein the camera control instruction includes respectively designating a zoom-in camera control instruction or a zoom-out camera control instruction for a pinch in gesture or pinch out gesture applied to said touch screen.

9. The remote control device according to claim 1, further comprising:
a face detector that localizes faces in a video conference stream, wherein
said processor is further configured to generate camera control instructions to zoom-in on a participant identifiable via said graphical user interface and touch screen display, based on the touch data and said at least one face localized by said face detector.

10. A method for remotely controlling a camera at a remote video conference endpoint, said method comprising:
establishing a communication link between a local video conference endpoint and said remote video conference endpoint;
receiving an endpoint ID from the at least one remote video conferencing endpoint;
generating at least one graphical object in response to receiving the endpoint ID;
generating with a processor a graphical user interface on a touch screen display of the local video conference endpoint, said graphical user interface including the at least one graphical object as part of a videoconference scene used to control at least one setting on the camera;
receiving touch data in response to an external input applied to a portion of the touch screen display on which the at least one graphical object is displayed and associating said touch data with a camera control instruction; and
sending the camera control instruction to the remote video conferencing endpoint to remotely control the camera.

11. The method according to claim 10, wherein said at least one graphical object comprises a video stream image from the camera at the remote video conferencing endpoint.

12. The method according to claim 11, further comprising:
receiving at a CODEC of the local video conferencing endpoint streams of conference video from one or more endpoints;
processing said streams;
outputting a corresponding set of video streams with reduced resolution and/or frame rate; and
sending said set of video streams to said touch screen display and displaying the video streams in said graphical user interface.

13. The method according to claim 10, wherein said generating step further comprises:
generating an image of a joystick icon in a separate control area; and
designating the camera control instruction based on a position and distance of the joystick icon relative to an initial default position.

14. The method according to claim 10, wherein said associating step comprises:
designating camera control instructions based on finger gestures as said external input applied to said touch screen display over the at least one graphical object.

15. The method according to claim 10, wherein said camera control instruction includes at least one of a zoom-in camera control instruction and a zoom-out camera control instruction generated in response to a pinch-in or pinch-out gesture respectively applied on said touch screen.

16. The device according to claim 10, wherein said camera control instruction includes designating a move up and/or down and/or left and/or right camera control instruction for a touch and drag gesture applied on said touch screen in an up and/or down and/or left and/or right direction.

17. The method according to claim 16, wherein the camera control instruction includes respectively designating a zoom-in camera control instruction or a zoom-out camera control instruction for a pinch in gesture or pinch out gesture applied to said touch screen.

18. The method according to claim 10, further comprising:
localizing a face in a video stream from said camera; and
generating a camera instruction to zoom-in on a participant identifiable via said graphical user interface based on the touch data and said at least one face designated in said localizing step.

19. A non-transitory computer readable medium having instructions that when executed by a processor remotely control a camera at a remote video conference endpoint, comprising:
establishing a communication link between a local video conference endpoint and said remote video conference endpoint;
receiving an endpoint ID from the at least one remote video conferencing endpoint;
generating at least one graphical object in response to receiving the endpoint ID;
generating with a processor a graphical user interface on a touch screen display of the local video conference endpoint, said graphical user interface including the at least one graphical object as part of a videoconference scene used to control at least one setting on the camera;
receiving touch data in response to an external input applied to a portion of the touch screen display on which the at least one graphical object is displayed and associating said touch data with a camera control instruction; and
sending the camera control instruction to the remote video conferencing endpoint to remotely control the camera.

20. The non-transitory computer readable medium of claim 19, wherein said associating step comprises:
designating camera control instructions based on finger gestures as said external input applied to said touch screen display over the at least one graphical object.

21. The non-transitory computer readable medium of claim 19, wherein said camera control instruction includes at least one of a zoom-in camera control instruction and a zoom-out camera control instruction generated in response to a pinch-in or pinch-out gesture respectively applied on said touch screen.

22. The non-transitory computer readable medium of claim 19, wherein said camera control instruction includes designating a move up and/or down and/or left and/or right camera control instruction for a touch and drag gesture applied on said touch screen in an up and/or down and/or left and/or right direction.

23. The non-transitory computer readable medium of claim 22, wherein the camera control instruction includes respectively designating a zoom-in camera control instruction or a zoom-out camera control instruction for a pinch in gesture or pinch out gesture applied to said touch screen.

24. The non-transitory computer readable medium of claim 19, further comprising:
localizing a face in a video stream from said camera; and generating a camera instruction to zoom-in on a participant identifiable via said graphical user interface based on the touch data and said at least one face designated in said localizing step.

\* \* \* \* \*